United States Patent Office 3,423,069
Patented Jan. 21, 1969

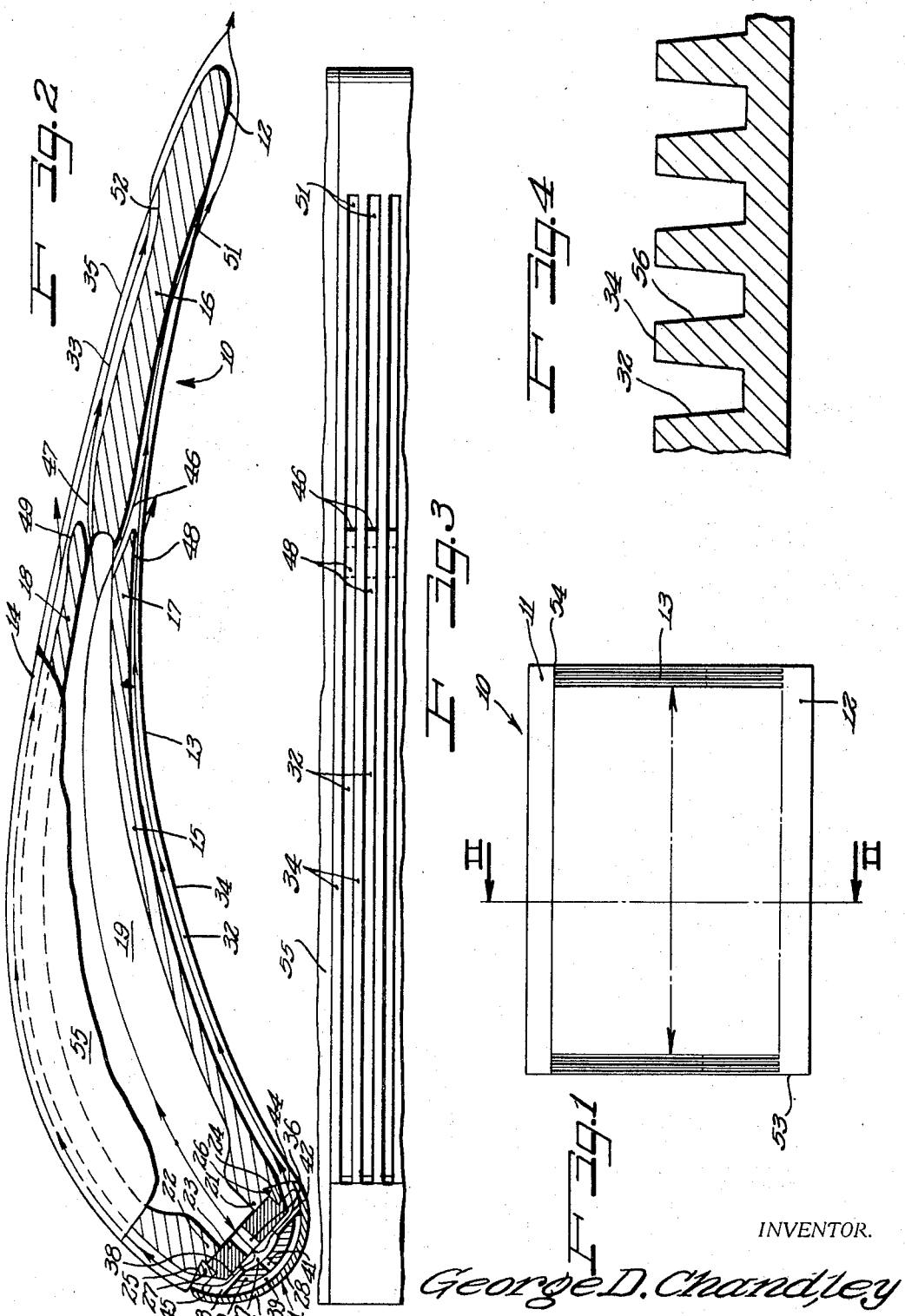

3,423,069
AIRFOIL
George D. Chandley, Alliance, Ohio, assignor to TRW Inc., Cleveland, Ohio, a corporation of Ohio
Filed Sept. 29, 1967, Ser. No. 671,870
U.S. Cl. 253—39.15          5 Claims
Int. Cl. F01d 5/08, 5/18

ABSTRACT OF THE DISCLOSURE

A vane or airfoil adapted for high temperature application having a plurality of parallel grooves in the outer surfaces extending from the leading edge towards the trailing edge. The vane has a cavity from which a cooling gas is delivered through ports adjacent the leading edge to the grooves to flow along the grooves to cool the surfaces of the vane and is then discharged adjacent the trailing edge in a thin layer to cool the trailing edge. Additional ports are provided between the cavity and the grooves intermediate the leading and trailing edges to supply additional cooling fluid to the grooves. The vane may further include a corrosion resistant shield made of a noble metal alloy such as platinum-20% rhodium or platinum-40% rhodium alloys which covers the leading edge to protect it from the high temperatures incurred during the use of the airfoil or vane.

BACKGROUND OF THE INVENTION

Field of the invention

This invention pertains to airfoils or vanes adapted for high temperature use such as in a gas turbine engine.

Prior art

Airfoils or vanes of the prior art have been cooled by various methods. One such method of cooling an airfoil used as a turbine blade is by circulating a cooling gas in the blade or airfoil as shown in U.S. Patent No. 2,779,565 to Bruckmann. Another method of cooling a turbine vane or blade is disclosed in the U.S. Patent No. 3,067,982 issued to Wheeler in which the outer surface of the vane is constructed of a porous mat constructed of a plurality of wires and the air is forced from the center of the vane through the pores to cool the vane's surface.

Another method for cooling turbine blades or airfoils consists in providing a flow of coolant gas along the surfaces of the airfoil. Such a method is used in the structure disclosed by Gilbert in his U.S. Patent No. 3,211,423 in which the coolant gas is provided by a tube placed along the leading edge of the airfoil and has ports to discharge a flow of the coolant gas along the airfoil's surfaces toward the trailing edge. Moore, in U.S. Patent No. 3,246,469 provides still another method of cooling an airfoil member by impinging a cooling fluid such as a gas on the inner surface of the pressure side of the vane and then conducting the cooling gas through a plurality of ports on the suction side of the vane to cool the surface of the vane on the suction side.

SUMMARY OF THE INVENTION

Since the efficiency and power of a turbine engine is greatly increased by raising the turbine inlet temperature, the cooling of the outer surfaces of the turbine vanes or airfoils is essential to prevent the melting of the airfoils or blades. The prior art devices such as those applying internal cooling do not cool the outer surface sufficiently to prevent overheating when the blades are used in a high temperature turbine. The use of a porous outer surface is not completely effective because the cooling air exiting from the airfoil's wall is inclined toward turbulence which destroys the thin cooling film formed on the surface of the blade. Furthermore, the area between the bores or holes is not covered with the air film and these areas thus become points of overheating. The method of cooling disclosed by the Gilbert patent has not been completely effective because of its turbulence in the cooling gases destroys the insulating layer of the cooling gas and thus allows the vane surface to be exposed to overheating. Whereas the airfoil of the Moore patent provides a series of ports between the leading and the trailing edges and supplies additional air to cover the surface which may reduce the possibility of the turbulence destroying the cooling layer, the structure as disclosed by Moore consists of a plurality of parts which must be assembled to form the airfoil and therefore the structure is expensive to manufacture.

The present invention provides a composite airfoil having a noble metal leading edge and ports adjacent the leading edge which conduct a cooling gas from the interior of the foil to a plurality of grooves and lands extending toward the trailing edge. The flow of the cooling gas in the grooves is free from the effects of turbulence in the air stream and provides the cooling and the insulating of the outer surface of the grooves and cooling of the lands of the outer surface. The invention further includes a second series of ports approximately one-half to two-thirds of the distance between the leading and the trailing edge to supply an additional cooling fluid or gas to the grooves. The grooves are provided with a shallow portion adjacent to the second series of ports and upstream therefrom to expel or discharge the heated cooling fluid that has been passing along the grooves to provide space for additional cooling fluid in the grooves.

Accordingly, it is an object of the present invention to provide an airfoil having its outer surfaces cooled and insulated by layers of a cooling fluid.

Another object of the present invention is to provide an airfoil having a plurality of grooves for conveying a discrete insulating layer of a cooling fluid from the leading edge towards the trailing edge.

A still further object of the present invention is to provide an airfoil having its outer surface cooled by the flow of an insulating layer of fluid which is free from turbulence.

Yet another object of the present invention is to provide an airfoil which is inexpensive to manufacture and which has its outer surfaces cooled by the flow of fluid in grooves provided on the outer surface.

A still further object of the present invention is to provide an airfoil having grooves on its outer surfaces to convey a cooling fluid from the leading edge towards the trailing edge and which has a high temperature resisting shield secured to the leading edge to protect the leading edge from overheating.

Many other advantages, features and additional objects of the present invention will become manifest to those versed in the art upon making reference to the detailed descriptions in the accompanying sheet of drawings in which a preferred structural embodiment incorporating the principles of the present invention is shown by way of illustrative example.

The drawings

FIG. 1 is a side elevational view of the airfoil of the present invention;

FIG. 2 is an enlarged cross section of the airfoil taken along lines II—II of FIG. 1;

FIG. 3 is a fragmentary side elevation of the airfoil illustrated in FIG. 2 having portions removed for purposes of illustration; and FIG. 4 is an enlarged cross section of the outer wall of the vane illustrated in FIG. 2.

On the drawings

The principles of this invention are particularly useful when embodied in an airfoil or vane such as the airfoil illustrated in FIG. 1 and generally indicated at 10. The airfoil 10 has a leading edge 11 and a trailing edge 12 interconnected by airfoil surfaces 13 and 14.

The foil 10 has a body portion 15 which has a thin solid portion 16 which extends into the trailing edge 12 and interconnects two integral wall portions 17 and 18 to define a cavity or chamber 19. The wall portions 17 and 18 are interconnected at their respective ends 21 and 22 by a spacer member 23. The ends 21 and 22 and the spacer member 23 have a shape to define a pair of grooves 24 and 25 which receive turned-in edges 26 and 27 of the leading edge shield 28. A shield back-up member or portion 29, which may be an integral portion of the spacer 23, is disposed between the spacer 23 and a curved portion 31 of the shield 28. The spacer member 23, the shield 28 and the back-up member 29 are attached to the ends 21 and 22 of the body portion 15 in any suitable manner such as brazing.

The outer surfaces 13 and 14 of the vane 10 are each provided with a series of parallel grooves 32 and 33 respectively, extending from the leading edge 11 toward the trailing edge 12. The grooves 32 are separated by the land portions 34 and the grooves 33 are separated by land portions 35 and these land portions 34 and 35 have the contour of the surfaces 13 and 14 respectively.

To provide a cooling fluid such as air to the grooves 32 and 33, the spacer member 23 has a plurality of openings or apertures 36 which allow the air in the chamber 19 to pass through the spacer 23 to a chamber 37 formed in the shield support member 29. The support member 29 is provided with a series of grooves or channels 38 which are adjacent the spacer 23. If the spacer 23 and support member 29 are provided as an integral one piece unit, the channels 38 are openings or passageways located between the support portion 29 and the spacer portion 23. The support member 29 has a second series of grooves 39 which are adjacent the inner surface of the curved portion 31 of the shield 28. A plurality of openings or apertures 41 interconnect the chamber 37 with the grooves 39 and the grooves or channels 38 which are in communication with the chamber 37 intercept the grooves 39 adjacent to the turned-in edges 26 and 27 to form a second chamber 42 and 43 respectively. The turned edges 26 and 27 have a plurality of openings or ports 44 and 45 respectively, which are in alignment with the grooves 32 and 33 of the surfaces 13 and 14.

The cooling fluid in the chamber 19 passes through the opening 36 to the chamber 37 as illustrated by the arrows. A portion of the cooling fluid flows through the opening 41 to the grooves 39 to cool the inner surface of the shield 28, while the remaining portion flows through the channels 38 to merge with that which has flown through the grooves or channels 39 at the respective subchambers 42 and 43 and then passes out of the ports 44 and 45 respectively, into the respective grooves 32 and 33. Once in the grooves 32 and 33 the cooling air flows, as indicated by the arrows, towards the trailing edge 12 to cool the surfaces 13 and 14 respectively. Since the cooling air becomes heated as it travels along the grooves 32 and 33, a second group of ports 46 and 47, respectively, are provided in the body portion 15 to supply additional cooling airs to the grooves 32 and 33, respectively. To provide space in the grooves for this additional cooling air, the grooves 32 and 33 become shallow at 48 and 49, respectively, prior to coming in contact with the ports 46 and 47. The shallow portions at 48 and 49 cause the heated air to be expelled or dumped from the groove upstream from the second group of ports 46 and 47 and thus provide the necessary space in the grooves for the additional cooling air or fluid to enter the grooves. At the ports 46 and 47 the grooves 32 and 33 again resume the depth that they had prior to shallowing out at 48 and 49 and continue towards the trailing edge 12. Adjacent to the trailing edge 12 the grooves become shallow at 51 and 52 respectively, to cause the cooling gas to be expelled from the grooves. The shallowing portions 51, 52 terminate the grooves 32 and 33 and cause the air traveling therein to form thin uniform layers of cooling gas that passes over the trailing edge 12 to cool and insulate the edge, as indicated by the arrows.

The vane 10 as described above may be mounted on any suitable rotor by means of any suitable root or base or it may be mounted between concentric shrouds. To maintain the cooling gases or fluids in the chamber 19 under pressure, the ends 53 and 54, of the vane 10 must be sealed by a member such as the plate 55 with appropriate means for introducing air under pressure into the chamber 19. The source of pressurized air for the chamber 19 may be any source such as from the compressor of the gas turbine.

The air in the grooves 32 and 33 cools the groove surfaces by providing a controlled film of cool air in the grooves which cools the surfaces of the grooves. The layer of cooling air also insulates the surface of the grooves from the hot gas passing around the vane or foil 10. The lands 34 and 35 are cooled by the air cooling the sides 56 of the grooves, as best illustrated in FIG. 4, and therefore reducing the amount of heat transfer from the lands to the center of the vane 10.

The trailing edge 12 is cooled by the layers of fluid passing around it. These layers, also, insulate the surface of the trailing edge from the hot gases passing over the surfaces of the vane or airfoil 10.

The shield 28 on the leading edge 11 is made from an alloy which has a low coefficient of expansion, a corrosion resistance at elevated temperatures and a high strength at elevated temperatures. A noble metal alloy such as a platinum-20% rhodium or platinum-40% rhodium alloy has been found to satisfy the requirements for the alloy used for the shield 28. By using a heat shield 28 made of the above alloys, the airfoil 10 is capable of operation at a higher temperature at the leading edge and requires less cooling by the air in the chamber 19 passing through the openings 41 and channels or grooves 39. This reduction in the amount of air necessary to cool the shield reduces the total volume of air required to cool the vane or airfoil 10.

A comparative test between the airfoil 10 of this invention and a standard center cooled airfoil shows that the surfaces of the airfoil 10 are substantially cooler at a given operating temperature than the surfaces of a standard airfoil and therefore do not suffer from melting or other damages due to the high operation temperature. In the comparative test, the airfoil of the present invention had a body portion cast of an alloy designated commercially as "SM–302" which has the following chemical composition: 85% carbon, 21.5% chromium, 10% tungsten, .005% boron, .2% zirconium, 9% tantalum, and the balance cobalt. The internal spacer 23 was formed of a case alloy designated commercially as "IN–100" which has a chemical composition of .18% carbon, 10% chromium, 15% cobalt, 3% molybdenum, 4.7% titanium, 5.5% aluminum, .014% boron, .06% zirconium, 1% vanadium and the balance nickel. The shield 28 was formed of a platinum-20% rhodium alloy sheet which was twenty-thousandths of an inch thick. The wall portions 17 and 18 were approximately .070 inch thick with the grooves being approximately .04 inch deep and .02 inch wide.

The standard blade which was internally cooled and the blade or vane 10 were tested in a thermal testing device to an outside leading edge temperature of 2680° F. The internal cavities of both vanes were maintained under a pressure of 5 p.s.i. of air at room temperature. Measurements conducted during the test showed that the standard blade by its internal cooling had its temperature reduced approximately 330° F. from the leading edge temperature of 2680° F. whereas the vane or airfoil 10 of the present invention showed that cooling by use of the air flowing in the grooves on the outer surface reduced the temperature of the surfaces approximately 530° F., a difference of 200° more than the cooling that occurred in the standard vane. In addition thereto, tests were run using the vane of the present invention in which the air pressure in the chamber 19 was at 1 p.s.i. and the test showed substantially the same degree of cooling on the outer surfaces of the vane. In examining the vanes after the tests, the leading and trailing edge of the standard vane showed some evidence of surface melting and blistering due to the temperatures of which the vane was subjected whereas the airfoil of the present invention did not show any evidence of melting.

The increased amount of cooling as shown by the above described test allows the airfoil or vane 10 of the present invention to be used in a turbine that has a higher operating temperature and, therefore, a greater efficiency. The airfoil 10 allows the gases to be received with a higher inlet temperature and, thus, the gas has a more complete combustion of the fuel mixture. The partial film cooling of the outer surface protects the surfaces more effectively than the best internal cooling system tested. The trailing edge of the vane 10 is cooled more effectively than existing methods of cooling trailing edges, such as by providing bores through the trailing edge. Thus, the present invention allows a greater flexibility in design of the vanes to be used in various turbine stages.

Although various minor modifications might be suggested by those versed in the art, it should be understood that I wish to employ within the scope of the patent warranted hereon, all such embodiments as reasonably and properly come within the scope of my contribution to the art.

I claim as my invention:

1. In an airfoil having leading and trailing edges interconnected by airfoil surfaces and having an internal fluid conduit means, the improvement comprising a plurality of grooves in the airfoil surface extending from adjacent the leading edge and terminating adjacent the trailing edge, each of said grooves having a first and a second port in communication with the fluid conduit means, said first port being disposed adjacent said leading edge, and said second port being disposed at a point downstream of said first port at a distance from the leading edge more than one-half the distance between the leading and trailing edges so that a cooling fluid in the conduit means is discharged through said first and second ports to flow in said grooves toward the trailing edge to cool the airfoil surfaces.

2. An airfoil according to claim 1, in which said grooves has a portion of decreased depth adjacent said second port and upstream therefrom to remove the cooling fluid traveling in said grooves prior to reaching said second ports to provide space for the additional fluid entering through said second ports.

3. An airfoil according to claim 2, in which said grooves are terminated adjacent said trailing edge by becoming increasingly shallow so that the fluid in said grooves pases over said trailing edge in a thin continuous layer to cool and insulate said trailing edge.

4. In an airfoil having leading and trailing edges interconnected by airfoil surfaces and having an internal fluid conduit means, the improvements comprising a plurality of grooves on the airfoil surface extending from adjacent the leading edge and terminating adjacent the trailing edge, each of the grooves adjacent the leading edge having a port in communication with the fluid conduit means so that a cooling fluid in the conduit means is discharged through said ports to flow in said grooves toward the trailing edge to cool the airfoil surface; a heat shield covering the leading edge and having a plurality of openings along its edge in alignment with said grooves and defining a part of said ports; and a back-up member for supporting said shield, said back-up member having grooves in communication with the fluid conduit means so that a portion of the fluid flowing to said ports passes through said grooves of said back-up member to cool said shield.

5. In an airfoil having leading and trailing edges interconnected by airfoil surfaces and having an internal fluid conduit means, the improvements comprising a heat shield of a platinum-rhodium alloy covering the leading edge and a plurality of grooves on the airfoil surface extending from adjacent the leading edge and terminating adjacent the trailing edge, each of said grooves adjacent the leading edge having a port in communication with the fluid conduit means so that a cooling fluid in the conduit means is discharged through said ports to flow in said groove toward the trailing edges to cool the airfoil surface.

References Cited

UNITED STATES PATENTS 2,780,435  2/1957  Jackson.
3,246,469  4/1966  Moore.
3,301,526  1/1967  Chamberlain.
3,315,941  4/1967  Davies.

FOREIGN PATENTS 1,151,368  8/1957  France.
846,583    8/1960  Great Britain.

EVERETTE A. POWELL, JR., Primary Examiner.

U.S. Cl. X.R.

253—39.1, 77